United States Patent
Birecki et al.

(10) Patent No.: US 8,894,761 B2
(45) Date of Patent: Nov. 25, 2014

(54) EMULSION-BASED THERMAL INKJET INKS

(75) Inventors: Henryk Birecki, Palo Alto, CA (US); Hou T. Ng, Campbell, CA (US); Howard S. Tom, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 14 days.

(21) Appl. No.: 13/982,371

(22) PCT Filed: Jan. 31, 2011

(86) PCT No.: PCT/US2011/023233
§ 371 (c)(1),
(2), (4) Date: Jul. 29, 2013

(87) PCT Pub. No.: WO2012/105950
PCT Pub. Date: Aug. 9, 2012

(65) Prior Publication Data
US 2013/0305958 A1    Nov. 21, 2013

(51) Int. Cl.
| | |
|---|---|
| *C09D 11/02* | (2014.01) |
| *C09D 11/38* | (2014.01) |
| *C09D 11/101* | (2014.01) |
| *C09D 7/12* | (2006.01) |
| *C09D 11/023* | (2014.01) |
| *C09D 11/30* | (2014.01) |
| *C09D 11/36* | (2014.01) |

(52) U.S. Cl.
CPC .............. *C09D 11/38* (2013.01); *C09D 11/101* (2013.01); *C09D 7/1291* (2013.01); *C09D 11/023* (2013.01); *C09D 11/30* (2013.01); *C09D 11/36* (2013.01)

USPC .................................... 106/31.26; 106/31.25

(58) Field of Classification Search
CPC ............................ C09D 11/101; C09D 11/36
USPC ............................................ 106/31.26, 31.25
See application file for complete search history.

(56) References Cited

U.S. PATENT DOCUMENTS

| | | | | |
|---|---|---|---|---|
| 5,047,084 A | * | 9/1991 | Miller et al. ............... | 106/31.25 |
| 5,749,952 A | * | 5/1998 | Tsang et al. ............... | 106/31.64 |
| 5,919,293 A | | 7/1999 | Moffatt et al. | |
| 5,945,484 A | * | 8/1999 | Fukasawa ...................... | 525/132 |
| 6,342,094 B1 | * | 1/2002 | Kabalnov ................... | 106/31.25 |
| 6,432,183 B1 | | 8/2002 | Kabalnov | |

(Continued)

FOREIGN PATENT DOCUMENTS

| | | |
|---|---|---|
| JP | 2002-212466 | 7/2002 |
| WO | WO 2005/054381 | 6/2005 |

OTHER PUBLICATIONS

English Machine Translation of JP 2002-212466.*

(Continued)

*Primary Examiner* — Veronica F Faison
(74) *Attorney, Agent, or Firm* — David Collins

(57) ABSTRACT

Emulsion-based thermal inkjet inks include a high boiling point carrier fluid; a colorant; and vesicles comprising a low boiling point expellant fluid, and an ionic surfactant comprising molecules, each having a head with affinity to expellant fluid material and a tail with affinity to carrier fluid, the vesicles having a core defined by the heads of the surfactant molecules, the expellant fluid contained in the core, with the vesicles dispersed in the carrier fluid. A method for preparing the thermal inkjet inks is also disclosed.

13 Claims, 2 Drawing Sheets

(56) References Cited

U.S. PATENT DOCUMENTS

| | | |
|---|---|---|
| 6,770,126 B1 | 8/2004 | Wu |
| 7,011,699 B2 * | 3/2006 | Yamanouchi et al. ..... 106/31.13 |
| 7,655,082 B2 * | 2/2010 | Zhu ........................... 106/31.25 |
| 7,717,989 B2 * | 5/2010 | Okuda et al. ............... 106/31.26 |
| 2001/0037749 A1 * | 11/2001 | Ogawa et al. .............. 106/31.26 |
| 2006/0036000 A1 * | 2/2006 | Adams ......................... 523/160 |
| 2006/0079603 A1 | 4/2006 | Sato et al. |
| 2006/0100309 A1 * | 5/2006 | Adams et al. ................. 523/160 |
| 2008/0173214 A1 | 7/2008 | Oyanagi et al. |
| 2009/0038507 A1 * | 2/2009 | Akers et al. ................ 106/31.26 |
| 2009/0090270 A1 | 4/2009 | Okuda et al. |
| 2009/0196994 A1 * | 8/2009 | Endo ............................. 427/256 |
| 2010/0086693 A1 * | 4/2010 | Yamada et al. ............... 427/256 |
| 2010/0092676 A1 | 4/2010 | Uozumi et al. |
| 2010/0180795 A1 | 7/2010 | Ezaki et al. |
| 2013/0074727 A1 * | 3/2013 | Ando et al. ................. 106/31.26 |

OTHER PUBLICATIONS

International Search Report and Written Opinion for PCT/US2011/023233 dated Oct. 31, 2011 (9 pages).

\* cited by examiner

EMULSION-BASED THERMAL INKJET INKS

BACKGROUND

Thermal inkjet technology is a significant technology that finds wide use. However, it is limited to using carrier liquids such as water that boil effectively at temperatures reached in the printhead, resulting from the selective application of a current to resistors that cause bubbles in the ink to form, thereby expelling, or jetting, droplets of ink through nozzles.

There are, however, applications which require jetting fluids that do not boil, either because their boiling temperatures are high or they do not have a clearly-defined phase transition which leads to a smoothed out transition to gas. In these cases, printheads based on piezoelectric technology are used. That is, a piezoelectric element is caused to vibrate, thereby jetting droplets of ink through nozzles. These piezoelectric printheads are much more difficult to make and are more expensive. Extension of thermal jetting technology to inks currently requiring piezoelectric printheads may have a significant impact on the thermal inkjet printer market. Such an extension may potentially enable low cost, high quality commercial graphics printing currently under development that assume the use of piezoelectric printheads.

DETAILED DESCRIPTION

Figure 1:
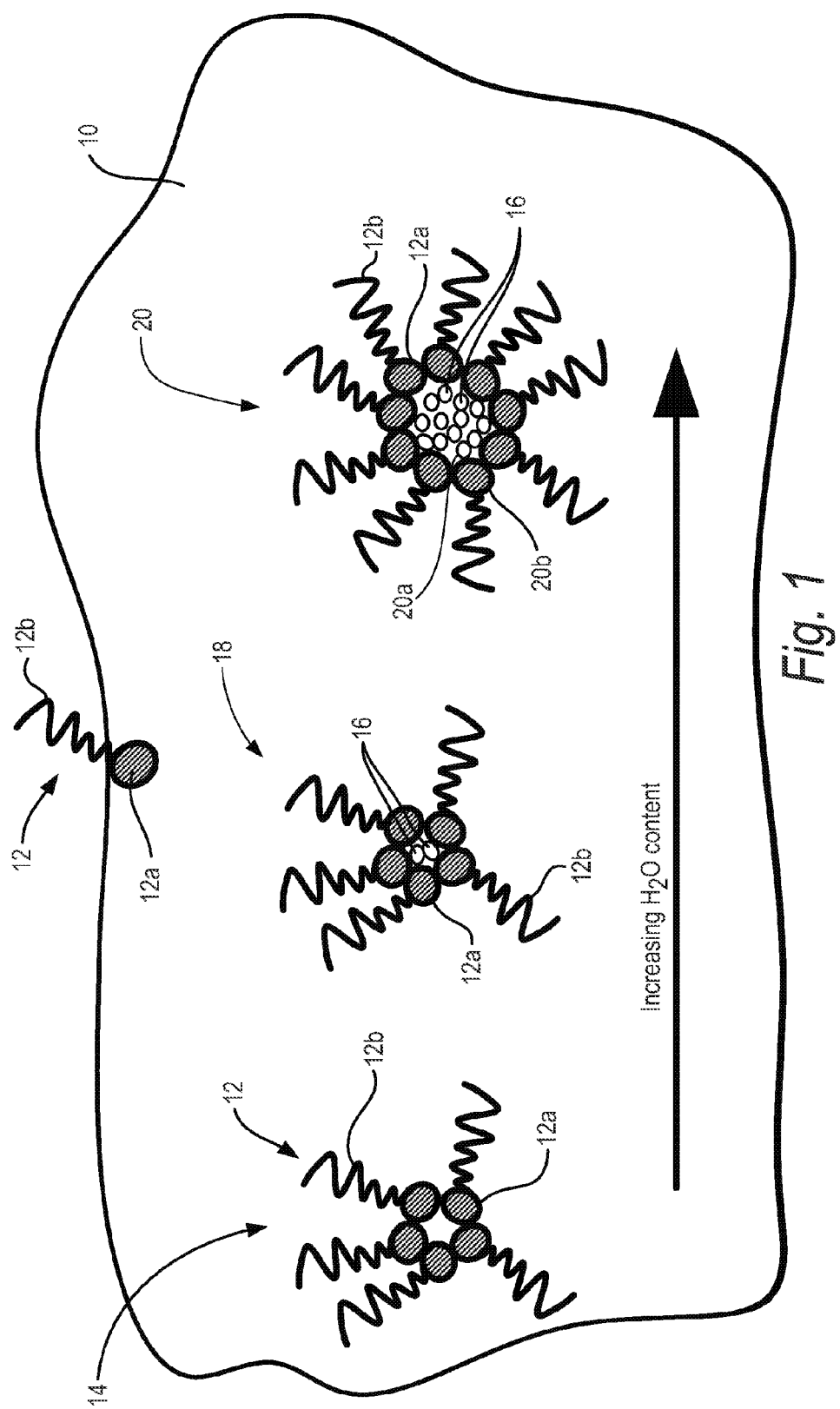
FIG. 1 is a schematic representation of the process for forming vesicles comprising a core for containing an expellant liquid, in accordance with an example of the present disclosure.

Reference is made now in detail to specific examples, which illustrates the best mode presently contemplated by the inventors for practicing the invention. Alternative examples are also briefly described as applicable.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "alkyl" refers to a branched, unbranched, or cyclic saturated hydrocarbon group, which typically, although not necessarily, includes from 1 to 50 carbon atoms, or 1 to 30 carbon atoms, or 1 to 6 carbons, for example. Alkyls include, but are not limited to, methyl, ethyl, n-propyl, iso-propyl, n-butyl, isobutyl, t-butyl, octyl, and decyl, for example, as well as cycloalkyl groups such as cyclopentyl, and cyclohexyl, for example.

As used herein, "aryl" refers to a group including a single aromatic ring or multiple aromatic rings that are fused together, directly linked, or indirectly linked (such that the different aromatic rings are bound to a common group such as a methylene or ethylene moiety). Aryl groups described herein may include, but are not limited to, from 5 to about 50 carbon atoms, or 5 to about 40 carbon atoms, or 5 to 30 carbon atoms or more. Aryl groups include, for example, phenyl, naphthyl, anthryl, phenanthryl, biphenyl, diphenylether, diphenylamine, and benzophenone. The term "substituted aryl" refers to an aryl group comprising one or more substituent groups. The term "heteroaryl" refers to an aryl group in which at least one carbon atom is replaced with a heteroatom. If not otherwise indicated, the term "aryl" includes unsubstituted aryl, substituted aryl, and heteroaryl.

As used herein, "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, and thioaryl.

The terms "halo" and "halogen" refer to a fluoro, chloro, bromo, or iodo substituent.

As used herein, "alcohol" means a lower alkyl chain alcohol, such as methanol, ethanol, iso-propanol, and butanol.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As mentioned above, the current solution is to use piezoelectric printhead technology for jetting inks based on an oil as the carrier liquid. Jetting of oil-based inks with the addition of isopropyl alcohol to the oil to provide thermal bubble generation has been demonstrated. However, this solution does not produce good quality jetting, primarily because the alcohol is dissolved in oil and does not nucleate the bubble rapidly enough.

In accordance with aspects of the teachings herein, thermal inkjet (TIJ) devices may be employed which allow jetting inks based on a carrier fluid that does not boil at temperatures reached in the jetting head. A bubble-forming fluid is suspended in the carrier fluid in the form of an emulsion. The emulsion is stabilized via use of surfactants which also may be used to stabilize the pigment suspension.

More specifically, the bubble-forming (expellant) liquid is contained in vesicles suspended in the carrier liquid. Examples of expellant liquids include water and a lower alkyl chain alcohol, such as ethanol, isopropanol, and butanol. Examples of carrier liquids include non-polar carrier fluids such as hydrocarbons, halogenated or partially halogenated hydrocarbons, and/or siloxanes. Some specific examples of non-polar carrier fluids include perchloroethylene, cyclohexane, dodecane, mineral oil, isoparaffinic fluids, cyclopentasiloxane, cyclohexasiloxane, and combinations thereof. An example of an isoparaffinic fluid is ISOPAR®, which is the brand name for several grades of high-purity isoparaffinic solvents with narrow boiling ranges, available from Exxon Mobile Corporation (Houston, Tex.). Specific examples of the isoparaffinic fluid that may be used in the practice of the various examples herein include, but are not limited to, ISOPAR® C, ISOPAR® H, ISOPAR® K, ISOPAR® L, and ISOPAR® M.

A relatively low boiling point liquid, such as water, that does not dissolve in the carrier fluid can be dispersed in the carrier fluid in small (approximately 2 to 200 nm diameter) droplets which are stabilized with a surfactant or a mixture of surfactants. This is quite similar to fat emulsion in milk, or pigments stabilized in ink dispersions. Because the low boiling point liquid is not dissolved in the carrier liquid, it preserves its first order phase transition properties, nucleation and phase separation required in a solution are avoided, and bubbles can form in a manner similar to that in conventional thermal ink-jet ink. Surfactants are typically used in inks to stabilize pigments. In most cases, the same surfactants can be used to stabilize the expellant liquid emulsion.

FIG. 1 depicts the process of forming water-carrying vesicles in oil. In a non-polar, carrier liquid 10, such as disclosed above, one or more surfactants 12 are added. The surfactants 12 comprise molecules containing a hydrophilic (polar) group 12a and a hydrophobic (oleophilic) group, such as an extended carbon chain, 12b. In the absence of water, the surfactant in oil forms micellar structures 14, where the polar groups 12a are on the inside of a spherical surfactant structure. Small additions of water 16 hydrate the core 14a of the micellar structure, seen as the modified micelle 18 with water in the core, but the water molecules do not have bulk water properties. As the water content is increased, there is a gradual transition to a vesicular structure 20, where a core 20a comprising bulk water 16 is surrounded by a surfactant shell 20b (i.e. a water-in-oil emulsion). In this structure 20, water basically possesses its bulk properties and if the vesicle size is small enough, as described in greater detail below, it forms a stable dispersion in the oil. Alternatively, this combination of vesicle carrying water in oil is called a microemulsion.

The interior of the vesicle is a water-containing core. The size of each vesicle, and hence the size of the water core (Le. amount of nucleating agent for TIJ firing), can be controlled by selecting the type of surfactant building blocks. It is not necessary to have very large vesicles, Once the vesicles are large enough to contain bulk water within which corresponds to core diameters larger than about 0.5 to 1 nm, the important parameter is overall concentration of water in the ink fluid. It has been experimentally shown that about 5% of water is sufficient to jet ISOPAR® L based inks as well as commercially available UV inks.

The amount of water in the final ink dispersion may be more important than the size of the emulsion for successful jetting. The size of the water core may vary with different types of ionic surfactants, and the surfactants can affect the amount of trapped water in the core. The minimum amount of water to cause jetting may be about 5 wt %. Typically, the ratio of water to surfactant may be about 1:1 to 3:1; a higher ratio may lead to collapse of the emulsion. The ratio at which the microemulsion collapses depends on the specific nature of the surfactant, expellant liquid and the carrier liquid.

Thus, a relatively low boiling point expellant liquid (e.g., water) 16 is suspended in a relatively high boiling point carrier liquid (e.g., paraffinic oil) 10 by virtue of its residing in the interior, or core 20a, of a vesicle 20. The amount of water 16 in the vesicle 20 is sufficient to cause jetting, and, because the water is contained in the interior of the vesicle, there is no phase separation between water and oil.

The size of the vesicles may be in the range of about 2 to 20 nm. For a surfactant of about 1 nm length, and based on a volume calculation of $(4/3\ \pi R^3)$, there is about 4 $nm^3$ of expellant liquid in 4 nm diameter vesicle.

Surfactants that may be employed in the practice of the various examples include, but are not limited to, ionic surfactants, either cationic or anionic. Exampler of suitable cationic surfactants include, but are not limited to, permanently charged quaternary ammonium cation (CTAB), cetylpyridinium chloride (CPC), polyethoxylated tallow amine (POEA), benzalkonium chloride (BAC), benzethonium chloride (BZT), dioctadecyldimethylammonium bromide, and organic polyamine hyperdispersions. Examples of suitable anionic surfactant include, but are not limited to, alkyl sulfates, such as ammonium lauryl sulfate and sodium lauryl sulfate (SDS); alkyl ether sulfates, such as sodium laureth sulfate, also known as sodium lauryl ether sulfate (SLES) and sodium myreth sulfate; docusates, such as dioctyl sodium sulfosuccinate; sulfonate fluorosurfactants, such as perfluorooctanesulfonate (PFOS) and perfluorobutanesulfonate; alkyl benzene sulfonates; alkyl aryl ether phosphate; alkyl ether phosphate; alkyl carboxylates; fatty acid salts (soaps), such as sodium stearate; sodium lauroyl sarcosinate; perfluorono-nanoate; and perfluorooctanoate (PFOA or PFO).

The ionic surfactants may be single tail surfactants, such as sodium dodecyl sulfate, or double tail surfactants, such as AOT (dioctyl sodium sulfosuccinate) or lecithin, Alkylamine-based surfactants are cationic single tail surfactants, while alkyl sulfonates are anionic single tail surfactants, either of which may be used in the practice of the examples.

There are three types of ink compositions that may be benefitted by the teachings herein: isoparaffinic oil-based ink dispersions, non-solvent based UV ink dispersions, and soy oil-based ink dispersions. Each of these three types of ink compositions may include vesicles comprising:

an ionic surfactant (anionic or cationic) with a critical micellar concentration (CMC) in the mmolar concentration range, such as one of the examples included in the compositions listed above, in an amount of about 1 to 25 wt %; and expellant, in an amount of about 1 to 20 wt %.

The expellant may be water. One or more alcohols, such as ethanol or isopropanol or butanol or any combination thereof, may be added. If added, the amount of the alcohol may be about 1 to 10 wt %. Alternatively, the alcohol, or a mixture of alcohols, may substantially totally replace the water.

The ink compositions may also include a viscosity modifying agent (VMA), such as, but not limited to, laurie acid, erucamide (13-docosenamide), and various commercial VMAs, in an amount of about 1 to 25 wt %.

The carrier liquid containing rnicroemulsion may be optically clear. By "optically clear" is meant that the vesicles do not produce significant light scattering.

Each of the three classes of inks mentioned above includes the expellant in the vesicles.

In the case of the isoparaffinic oil-based ink dispersions, the ink compositions may include:
  pigment: 1 to 10 wt %;
  dispersant(s): 0.5 to 5 wt %;
  ionic surfactant: 1 to 25 wt %, and
  water: 1 to 20 wt %; and
  ISOPAR®: balance.

The dispersant serves to stabilize the pigment in the ink. The dispersant may be the same as or different than the ionic surfactant used to form the vesicles. One or more hyperdispersants may be employed as the dispersant. Examples of the dispersant(s) include polyamine-based surfactants, such as SOLSPERSE® series, SOLPLUS® IRCOSPERSE™ series, and COLORBURST™ series, available from Lubrizol Advanced Materials (Cleveland, Ohio).

In the case of the non-solvent based UV ink dispersions, the ink compositions may include:
  pigment: 1 to 10 wt %;
  dispersant(s): 0.5 to 10 wt %;
  monomer(s): 40 to 80 wt %;
  photoinitiator(s): 1 to 10 wt %; and
  ionic surfactant: 1 to 15 wt %,
  water: 1 to 15 wt %,
  ISOPAR®: 1 to 20 wt %, and
  viscosity modifying agent: 1 to 20 wt %.

Lauric acid may serve as both a VMA to bring the final ink dispersion to less than 4 cps, so that it can be jetted with a TIJ printhead, and a surfactant of the vesicles. Because of its linear structure, the structural integrity of the vesicles is enhanced. It can also constitute a component of the UV ink, i.e. it can be introduced directly into the UV inks.

In the case of the soy ink dispersions, the ink composition may include:

pigment: 1 to 10 wt %;
dispersant(s): 0.5 to 10 wt %;
resin: 1 to 15 wt %;
waxes: 1 to 15 wt %,
soybean oil: 40 to 80 wt %; and
ionic surfactant: 1 to 15 wt %,
water: 1 to 15 wt %,
ISOPAR®: 1 to 20 wt %, and
viscosity modifying agent: 1 to 20 wt %.

Again, lauric acid may serve as both a VMA to bring the final ink dispersion to less than 4 cps, so that it can be jetted with a TIJ printhead, and a surfactant of the vesicles. Because of its linear structure, the structural integrity of the vesicles is enhanced. It can also constitute a component of the soy ink, i.e. it can be introduced directly into the soy inks.

The oil-based inkjet inks may be prepared by mixing the expellant liquid in the surfactant. This combination may then be mixed with the carrier fluid to form the vesicles. However, the sequence of adding the three components is immaterial. On the other hand, agitation may be used to provide well-formed vesicles in the carrier fluid. The concentration range of the vesicles in the ink may be in the range of about 2 to 50 wt %.

Feasibility of jetting water-filled vesicles has been demonstrated. Specifically, modified oil-based inks used an HP Labs internal printer under product development and off-the-shelf commercial UV curable inks used in a printer for printing UV inks. Neither of these inks can be jetted using thermal inkjet printing without the modification disclosed herein.

The oil-based inks are ink formulations that typically contain ISOPAR® as the carrier liquid, although other carrier liquids may be employed, as disclosed above. There are many varieties of ISOPAR®, each having their own characteristic boiling points. For example, ISOPAR® L has a boiling point of about 200° C.

In one case, 2.8 wt % of an anionic surfactant such as sodium bis(2-ethylhexyl) sulfosuccinate (AOT) and 4.6 wt % water were added together, as described above, and then added to ISOPAR® L, and mixed to form vesicles. An ink was formed with 2 wt % magenta pigment. The ink was successfully jetted in a thermal inkjet printer.

In another case, 5 wt % AOT surfactant and 7.7 wt % water were combined, as described above, to form vesicles in ISO-PAR® L. An ink was formed with 2 wt % magenta pigment. A thermal inkjet printhead was employed that emitted a drop weight of about 10 pl. The TIJ head firing conditions were set at 25V and 1.7 μs pulse with 0.4 μs precursor pulse at 35° C. The drop speed was about 7.5 m/s. The jetting trajectory and characteristics were fairly consistent across the observed nozzles, suggesting reasonably good dispersion stability of the water-in-oil emulsion.

Using a TIJ pen on an inkjet HP PhotoSmart printer, regular printing was successfully performed with both inks on ColorLok® print media, available from Hewlett Packard Company (Palo Alto, Calif.).

A UV ink dispersion was prepared. The composition comprised HP Scitex FB221 light magenta ink. The UV ink modified with the vesicles formed by an expellant and an ionic surfactant compared with inks not so modified showed good dispersion stability and uniformity even after addition of the emulsion. No difference in side by side samples was observed for several days.

In order to be able to add the water to the UV ink, a water/surfactant emulsion was prepared in ISOPAR® L and the resulting water-in-oil emulsion was mixed with the UV ink. No jetting at all was observed for the unmodified UV ink in a thermal inkjet printhead.

In the composition, the following components were added to FB221 ink: 8.325 wt % AOT, 8.325 wt % water. 8.325 wt % ISOPAR® L, and 15 wt % lauric acid. A TIJ printhead was employed, with a drop weight of about 10 pl. The head firing conditions were set at 24V, with a main pulse width of 3 μs, a precursor pulse of 0.5 μs at 55° C., and a firing frequency of 1 KHz. The drop velocity was about 7.5 m/s. The ink was successfully jetted and appeared similar to the unmodified UV ink jetted from a conventional Scitex piezoelectric printhead.

The drop to drop variability was similar for all the oil-based inks and UV ink modified with the vesicles disclosed herein. The energies required to jet (via a thermal printhead) both modified oil-based inks and UV ink were only slightly larger than jetting conventional water-based TIJ inks and the timescales were comparable.

An inkjet ink may include an ink vehicle and a colorant dispersed in the ink vehicle. In some examples, the ink vehicle may be non-polar aliphatic solvents, such as any of the carrier liquids disclosed above, including, but not limited to paraffinic liquids, e.g., ISOPAR®, mineral spirits, or petroleum distillater and non-polar aromatic solvents, such as toluene or xylene.

Figure 2:
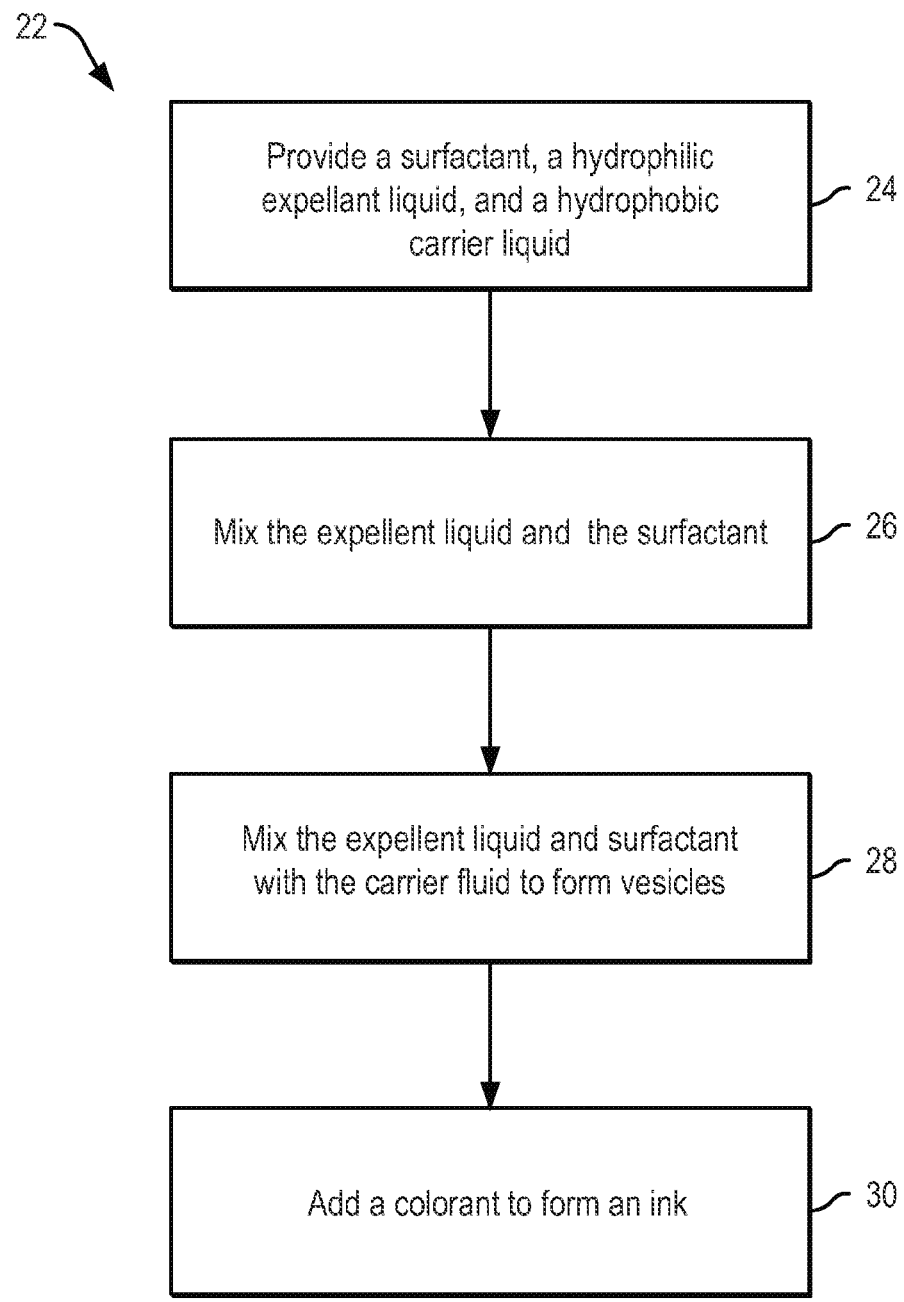
FIG. 2 is a flow chart setting forth a method of forming a thermal inkjet ink in accordance with an example of the present disclosure.

FIG. 2 is a flow chart, depicting a process 22 for preparing emulsion-based thermal inkjet inks in accordance with the teachings herein. The process 22 includes providing 24 the surfactant, the hydrophilic expellant liquid, and the hydrophobic carrier liquid. The process 22 further includes mixing 26 the expellant liquid in the surfactant. The process 22 further includes mixing 28 the surfactant and propellant with the carrier fluid to form vesicles. The process 22 further includes adding 30 a colorant to form the ink. Of course, other additives, as discussed below, may also be added as appropriate. A different process flow can be as follows: adding the vesicles to a colorant containing oil-based ink dispersion. The colorant may be stabilized by dispersant.

A method to employ low-molecular weight alcohols is as follows: add 1 to 50 wt % alcohol (or mixture of alcohols) to a high molecular weight mineral oil (or mixture of oils) containing 1 to 50 wt % of ionic surfactant (or mixture of surfactants) such as SOS. Examples of the high molecular weight mineral oils include aliphatic hydrocarbons with at least 16 carbons. The high molecular weight mineral oils are immiscible with the low molecular weight alcohols. The pre-mixed emulsion is then added into a regular oil-based inkjet dispersion. To preserve the integrity of the vesicles in the final ink dispersion, a small amount of water can be added into the alcohol during the mixing process.

In such an ink, the concentration of the colorant may range from about 1 to 10 wt %, the concentration of the solvent/co-solvent may range from about 80 to 98 wt %, and the concentration of other additives (discussed below, may range from about 1 to 15 wt %, and the vesicles may range from about 2 to 40%.

The inkjet ink vehicles may include a solvent or multiple co-solvents. In addition to the colorant and solvent(s), e.g., aliphatic solvent, the balance of the formulation may include other vehicle components known in the art, such as biocides, viscosity modifiers, preservatives, and the like. The jetting architecture that can be used with the inks of the present disclosure includes thermal printheads.

Classes of co-solvents that can be used may include, but are not limited to, organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Consistent with the formulation of this disclosure, various other additives may be employed to optimize the properties of the ink composition for specific applications. Viscosity modifiers and buffers may also be present, as well as other additives known to those skilled in the art to modify properties of the ink as desired. Such additives can be present at from 0 wt % to 20 wt %.

The inkjet ink vehicle may also include a surfactant, in addition to the surfactant employed in forming the vesicles. In one example, the surfactant may be stearic acid, dioctylsulfosuccinate, dioctylbezenesulfonic acid and sodium dodecylsulfate. In another example, the surfactant may be a nonionic surfactant. Suitable surfactants that can be used include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the inkjet inks may range from 0.01 wt %/to 10 wt %.

The inkjet ink compositions of the present disclosure may also be suitable for use on many types of substrates of recording media, including but not limited to cellulose-based paper media, various cloth materials, polymeric materials (non-limitative examples of which include polyester white film or polyester transparent film), vinyl media, photopaper (non-limiting examples of which include polyethylene or polypropylene extruded on one or both sides of paper), metals, ceramic tiles, glass, and/or mixtures or composites thereof. A non-limiting example of a suitable metal material is a metal in foil form made from, for example, at least one of aluminum, silver, tin, copper, alloys thereof, and/or mixtures thereof. In one example, the recording medium can include paper or specially coated media.

The pigment particles are selected from organic or inorganic pigments, and have an average particle size ranging from about 1 nm to about 1 μm. In some instances, the average particle size ranges from about 20 nm to about 1 μm. Such organic or inorganic pigment particles may be selected from black pigment particles, yellow pigment particles, magenta pigment particles, red pigment particles, violet pigments, cyan pigment particles, blue pigment particles, green pigment particles, orange pigment particles, brown pigment particles, and white pigment particles.

A non-limiting example of a suitable inorganic black pigment includes carbon black. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL®) series, or the MONARCH® series manufactured by Cabot Corporation, Boston, Mass., (such as, e.g., REGAL® 400R, REGAL® 330R, REGAL® 660R, MOGUL® L, MONARCH® 700, MONARCH® 800, MONARCH® 880, MONARCH® 900, MONARCH ® 1000, MONARCH® 1100, MONARCH° 1300, and MONARCH® 1400); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S150, Color Black S170, PRINTEX® 35, PRINTEX® U, PRINTEX® V, PRINTEX® 140U, Special Black 5, Special Black 4A, and Special Black 4). A non-limiting example of an organic black pigment includes aniline black, such as C.I. Pigment Black 1.

Non-limiting examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.1. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.l. Pigment Yellow 114, C.I. Pigment Yellow 117, C.I. Pigment Yellow 120, C.I. Pigment Yellow 124, CI Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.l. Pigment Yellow 167, C.I. Pigment Yellow 172, and C.I. Pigment Yellow 180.

Non-limiting examples of suitable magenta or red or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, CI Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, al, Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Non-limiting examples of blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Non-limiting examples of green organic pigments include C.I. Pigment Green 1, C.I. Pigment Green 2, C.I. Pigment Green, 4, C.I. Pigment Green 7, C.I. Pigment Green 8, C.I. Pigment Green 10, C.I. Pigment Green 36, and C.I. Pigment Green 45.

Non-limiting examples of brown organic pigments include C.I. Pigment Brown 1, C.I. Pigment Brown 5, C.I. Pigment Brown 22, C.I. Pigment Brown 23, C.I. Pigment Brown 25, and C.I. Pigment Brown, C.I. Pigment Brown 41, and C.I. Pigment Brown 42.

Non-limiting examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

Alternatively, low-cost dyes may be used as colorants in place of pigment particles. Dyes are dispersed in the ink vehicle. Examples of dyes include, but are not limited to, Reactive Red 180, Acid Red 52, Acid Blue 9. Direct Blue 199, Acid Yellow 23, Direct Black 168, Direct Black 19, Solvent Yellow 2, Solvent Yellow 7, Solvent Yellow 14, Solvent Yellow 16, Solvent Yellow 18, Solvent Yellow 33, Solvent Yellow 56, Solvent Yellow 72, Solvent Red 1, Solvent Red 23, Solvent Red 24, Solvent Red 49, Solvent Red 111, Solvent Red 207, Solvent Orange 2, Solvent Orange 7, Solvent Blue 4, Solvent Blue 35, Solvent Blue 36, Solvent Blue 38, Solvent Black 5, Solvent Black 7, Solvent Green 3, Solvent Green 7, Solvent Violet 13, Yellow M8G (R. Yellow 86), Yellow M4G (R. Yellow 22), Yellow MGR (R. Yellow 7), Yellow M3R (R. Orange 86), Yellow M4R (R. Orange 14), G. Yellow MRR. Yellow 44), Orange M2R (R. Orange 4), Red M5B (R. Red 2), Red M8B (R. Red 11), Magenta MB (R. Violet 13), Blue MR (R. Blue 4), 60° CBlue M2R (R. Blue 81), Blue M4GD (R. Blue 168), ACID GREEN G, ACID DARK GREEN GNB, ACID MILLING BLACK GD, ACID MILLING BLACK VL, ACID ACIDIGREY BL, ACID BLACK BGL (200%), ACID BLACK NT, ACID YELLOW 2G, ACID TETRAZINE YELLOW R, ACID METANIL YELLOW G, ACID YELLOW 5GN, ACID OL YELLOW iv1GL, ACID YELLOW G, ACID ORANGE II, ACID CRYSTAL ORANGE G, ACID ORANGE CR, ACID RED 2G (GERAMINE G), ACID RUBINE C, ACID SCARLET 3R, ACID RHODAMINE B 400%. ACID RUBINE 3G. ACID SCARLET MOO, ACID F. RED A. ACID MILLING RED RS, ACID MAROON V, ACID RED 3BN, ACID BR. RED 2B, ACID PATENT BLUE VS, ACID PATENT BLUE AS, ACID BLUE V 'BLUE, ACID BLUE FB, ACID BLUE GRL, ACID F BLUE B, ACID BRILL BLUE RRL, ACID COMMASIE BLUE RL, ACID INK BLUE G, ACID N. BLUE 5R, ACID VIOLET 4BS, ACID VIOLET 4BN, ACID RED 108, ACID BROWN RD, ACID BROWN ER, ACID BROWN C2G, ACID BROWN SGL, ACID GREEN B, ACID GREEN V 333%, ACID DARK GREEN B, Yellow 3GX, Paper Yellow T, Crysophinine, Yellow 5GLL H/C, Yellow 5GLL, Yellow RSLW, Yellow RL, Sunfast Yellow RCH, Orange SE 200%, Orange TGLL, Orange TGLL 200%, Viscose Orange BRO, Scarlet 4BS, Red 12B, Light Red BLN, Red 5B, Red 5B 200%, Violet MB, Brill Violet HELIO B, Sky Blue FBC, Sky Blue FFH, Blue IR, Blue GLL, Blue GLL 200%, Fast Blue RLL, Tur. Blue SBL, Fast Tur. Blue FBL, Green AR, Green NB, Black GR, Diaz° Black OB, Diazo Black BF, Gray 2RL, Brown 2GL, Black E, Brown MR, Congo Red. Blue 2B, Green PLS, Green B, Boxdex BW, Black BT, Orange GR, Brown BRLL, AURAMINE O, AURAMINE OF Spirit Soluble, RHODAMINE B, METHYL VIOLET, CRYSTAL VIOLET, VICTORIA BLUE B, VICTORIA BLUE R, MALACHITE GREEN, BRILLIANT GREEN, Fast Red B Base, Fast Bordeaux GP Base, Fast Red GL Base, Fast Scarlet RC Base, Fast Scarlet RE Base, Fast Red RL Base, Fast Blue B Base, Naphthol AS, Naphthol AS BS, Naphthol AS BO, Naphthol ASD, Naphthol ASG, Fast Red B Salt, Fast Bordeaux GP Salt, Fast Red GL Salt, Fast Scarlet RC Salt, Fast Scarlet RE Salt, Fast Red RL Salt, Fast Blue B Salt, Ribafix Yellow H5G, Ribafix Yellow H4G, Ribafix G. Yellow HR, Ribafix Orange H2R, Ribafix Red P2B, Ribafix Red P3B, Ribafix Red 6BX, and Ribafix Red H8B.

While the disclosure has been described with reference to certain examples, those skilled in the art will appreciate that various modifications, changes, omissions, and substitutions can be made without departing from the spirit of the disclosure.

What is claimed is:

1. Emulsion-based thermal inkjet inks, including:
   a non-solvent based ultraviolet (UV) ink dispersion, including:
      a high boiling point carrier fluid present in an amount ranging from about 1 wt % to about 20 wt %;
      a colorant consisting of a pigment present in an amount ranging from 1 wt % to 10 wt %;
      a dispersant present in an amount ranging from 0.5 wt % to 10 wt %;
      vesicles comprising:
         a low boiling point expellant fluid present in an amount ranging from 1 wt % to 15 wt %; and
         a surfactant present in an amount ranging from 1 wt % to 15 wt %, the surfactant comprising molecules, each having a head with an affinity to the expellant fluid and a tail with an affinity to the carrier fluid, the vesicles having a core defined by the heads of the surfactant molecules, the expellant fluid contained in the core, with the vesicles dispersed in the carrier fluid;
      a monomer present in an amount ranging from 40 wt % to 80 wt %;
      a photoinitiator present in an amount ranging from 1 wt % to 10 wt %; and
      a viscosity modifying agent present in an amount ranging from 1 wt % to 20 wt %.

2. The inks of claim 1 wherein:
   the carrier fluid is hydrophobic;
   the expellant fluid is hydrophilic; and
   the surfactant is ionic.

3. The inks of claim 1 wherein the size of the vesicles is in a range of 2 to 20 nm.

4. The inks of claim 1 wherein the expellant fluid is selected from the group consisting of water and a lower alkyl chain alcohol.

5. The inks of claim 1 wherein the carrier fluid is selected from the group consisting of hydrocarbons, halogenated or partially halogenated hydrocarbons, and siloxanes.

6. The inks of claim 5 wherein the carrier fluid is selected from the group consisting of perchloroethylene, cyclohexane, dodecane, mineral oil, isoparaffinic fluids, cyclopentasiloxane, cyclohexasiloxane, and combinations thereof.

7. The inks of claim 1 wherein the surfactant is selected from the group consisting of anionic surfactants, and cationic surfactants, comprising single tail surfactants, double tail surfactants, or triple tail surfactants.

8. The inks of claim 1 wherein the non-solvent based ultraviolet (UV) ink dispersion further includes at least one additive selected from the group consisting of co-solvents, biocides, materials for pH adjustment, sequestering agents, and preservatives.

9. The inks of claim 1 wherein the dispersant is the same as or different from the surfactant.

10. A method of preparing the emulsion-based thermal inkjet inks of claim 1, the method comprising:
   providing the surfactant, the expellant fluid, and the carrier fluid;
   mixing the expellant fluid and the surfactant with the carrier fluid to form the vesicles in the carrier fluid; and
   adding the vesicles in the carrier fluid and a viscosity modifying agent to an ultraviolet (UV) ink dispersion to form the non-solvent based UV ink dispersion, the UV ink dispersion including:
      the monomer;
      the photoinitiator;
      the pigment; and
      the dispersant.

11. The method of claim 10 in which the surfactant, the expellant fluid, and the carrier fluid are mixed in any order, with stirring.

12. The inks of claim 1 wherein the viscosity modifying agent is lauric acid and wherein a viscosity of the non-solvent based UV ink dispersion is less than 4 cps.

13. Emulsion-based thermal inkjet inks, consisting of:
a non-solvent based ultraviolet (UV) ink dispersion, consisting of:
   a high boiling point carrier fluid present in an amount ranging from about 1 wt % to about 20 wt %;
   a pigment present in an amount ranging from 1 wt % to 10 wt %;
   a dispersant present in an amount ranging from 0.5 wt % to 10 wt %;
   vesicles consisting of:
      water present in an amount ranging from 1 wt % to 15 wt %; and
      a surfactant present in an amount ranging from 1 wt % to 15 wt %, the surfactant comprising molecules, each having a head with an affinity to the water and a tail with an affinity to the carrier fluid, the vesicles having a core defined by the heads of the surfactant molecules, the water contained in the core, with the vesicles dispersed in the carrier fluid;
      wherein a ratio of the water to the surfactant ranges from 1:1 to 3:1;
   a monomer present in an amount ranging from 40 wt % to 80 wt %;
   a photoinitiator present in an amount ranging from 1 wt % to 10 wt %; and
   a viscosity modifying agent present in an amount ranging from 1 wt % to 20 wt %; and
optionally any of a co-solvent, a biocide, a preservative, or combinations thereof.

* * * * *